Dec. 15, 1964 M. WEISS 3,161,775
RADIATION THERMOMETER
Filed Aug. 21, 1961
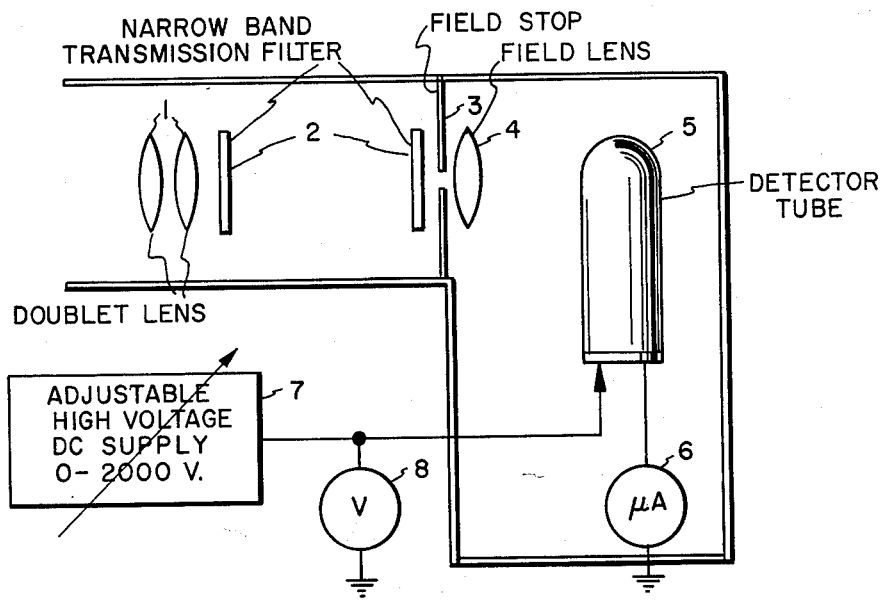
FIG. I
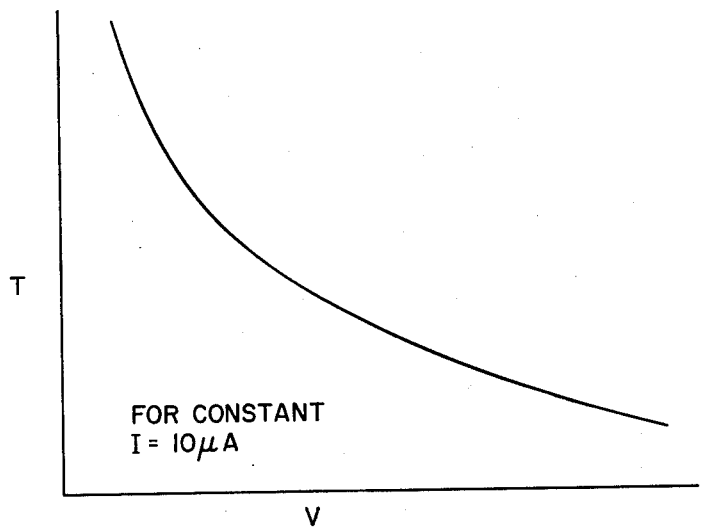
FIG. 2
INVENTOR.
MORRIS WEISS
BY
ATTORNEY United States Patent Office 3,161,775
Patented Dec. 15, 1964

3,161,775
RADIATION THERMOMETER
Morris Weiss, Stamford, Conn., assignor to Barnes Engineering Company, Stamford, Conn., a corporation of Delaware
Filed Aug. 21, 1961, Ser. No. 132,790
4 Claims. (Cl. 250—86)

This invention relates to an improved radiation thermometer and, in a more particular aspect, to radiation thermometers which are capable of measuring high temperatures.

The measurement of temperatures at a distance without contact with a material constitutes an important field of instrumentation. Various types of instruments have been developed such as optical pyrometers for temperatures sufficiently high to result in the emission of visible light, radiometers, usually infrared radiometers, and the like. It is with the latter general type of instrument that the present invention deals although in its preferred embodiment the present invention utilizes radiations in the visible and near ultraviolet.

It is possible to measure temperature radiometrically but such instruments in their ordinary form are subject to a very serious drawback, namely that when the temperature of the body to be measured involves a body that has significant emissivity an error is introduced which can seriously vitiate results. The problem is rendered even more serious when the instrument is used to continuously monitor the temperature of moving material, for example, a strip or a rod of very hot material which may be produced at quite high speeds, up to 90 miles an hour in the case of a steel rod mill. Under these high temperature conditions the surface of metals and other bodies tend to be altered with a resulting change in emissivity which does not remain constant and so cannot be applied as a correction factor or calibrated out of a temperature measuring instrument. These inaccuracies due to changing emissivities have constituted a serious limitation on the ordinary type of radiation thermometer and for thoroughly accurate work has thus significantly reduced the field in which this type of instrument can be used.

The present invention permits measurement with an accuracy of 5% under the worst conditions encountered with low temperature bodies up to 2% or slightly better with hotter materials. In the latter case also, the problem of range of instrumental response is also solved very simply and cheaply.

In general the instrument of the present invention can be used from temperatures as low as room temperature up to temperatures of 3,000° K. or even higher where a slight compromise with maximum precision is allowable. This is not to say that a single instrument with no change will measure temperatures accurately over this enormous span. As will appear below the instruments measure temperatures over substantial ranges, for example, 1,000 to 3,000° K. but it is necessary to choose different radiation bands for other temperatures which is easily done with filters. As is the case with many instruments the narrower the range over which the temperature is measured the greater the accuracy obtainable. For example, measurement over a range of 2,000 to 3,000° K. can be effected with greater precision than if it is intended to use the same instrument without filter change to measure from 1,000 to 3,000° K.

In its broader aspects the present invention utilizes for measurement a moderately narrow band of radiation at a spectral wavelength $\lambda$ much shorter than that wavelength $\lambda_m$ corresponding to maximum radiation of a black body at the temperature or temperatures to be measured. In general the present invention operates well over ranges from $\lambda_m$ twice as long as the wavelength $\lambda$ used to situations where $\lambda_m$ is five or slightly even more times as long as the wavelength $\lambda$ used. The range is determined by practical operating considerations which will be brought out below. With a ratio $\lambda_m/\lambda$ of 2 accuracies of 5% are readily obtainable for emissivity changes of up to 2:1. With a ratio $\lambda_m/\lambda$ of 5 the accuracy can be 2% or better. Theoretically the greater the ratio the greater the precision. At $\lambda_m$ the instrument response is proportional to the fifth power of absolute temperature. At the shorter wavelength, $\lambda$, the power is much greater than five. Emissivity variations, however, affect results only linearly. Theoretically precise measurements could be obtained with a sufficiently large ratio even with enormous variations in emissivity far beyond anything ever encountered. However, as pointed out above there is a practical limit to the size of the ratio.

In discussing the ratio $\lambda_m/\lambda$ to be used there are two considerations which in the last analysis may be considered as two quite different aspects of the same consideration. The limiting factors involve instrument sensitivity. This factor involves a product of actual energy available multiplied by detector sensitivity. Two practical examples will illustrate the way in which this limitation affects instrument choice and precision capability.

Let us first take a situation presented by measuring a body at 2,000° K. which is in the middle of the high temperature range from 1,000 to 3,000° K. For a black body $\lambda_m$ is about 1.5$\mu$ and the energy radiated about 40 watts/cm.$^2$/micron. Taking a ratio $\lambda_m/\lambda$ of 5 the wavelength $\lambda$ at which measurements are to be effected is 0.3$\mu$, i.e. in the ultraviolet. Here the fractional amount of energy compared to $\lambda_m$ approximates $2.5 \times 10^{-5}$ hence an energy level of about 0.001 watts/cm.$^2$/$\mu$. This is ample energy for sensitive detectors such as photomultiplier tubes. If a larger ratio $\lambda_m/\lambda$ is used $\lambda$ becomes still shorter and gets beyond the wavelengths to which the sensitive detectors respond. If the preferred detector is to be used at 1,000° K. a ratio of $\lambda_m/\lambda$ of greater than five is not precluded, $\lambda_m$ is now about 2.8$\mu$, the energy level about 1.5 watts/cm.$^2$/$\mu$ and at $\lambda_m/\lambda$ of 5:1, that is to say for $\lambda=0.56\mu$, the watts available at the measuring temperature are about 7.5 microwatts which is still ample. And even with a ratio of about 6 to 1 there is still available only a little less than a microwatt at 0.467$\mu$. It will be seen that in this case it is possible to exceed the 5 to 1 ratio substantially and still get measurements. This is not practical with the 2,000° K. body because now the wavelength is so far in the ultraviolet that photomultiplier tubes are not readily available. It will be seen, therefore, that in the case of these relatively hot bodies the limit on the ratio is set by the capability of the detector rather than energy considerations.

Now let us consider another temperature measurement at the other extreme of the practical range, namely 300° K. (room temperature). Here $\lambda_m$ is 10$\mu$ and the wattage available about 0.003 watt/cm.$^2$/$\mu$. If now the 5 to 1 ratio were used the available energy at $\lambda=2.0\mu$ would be $6.0\times10^{-8}$/cm.$^2$/$\mu$ and we encounter the problem that very high sensitivity detectors such as photomultiplier tubes are not available at the present time for a wavelength of $2\mu$. It is necessary to use thermal detectors such as PbS or thermistors which are several orders of magnitude less sensitive than are photomultiplier tubes. Energy considerations and other instrumental factors, therefore, preclude quite so large a ratio of $\lambda_m/\lambda$ at the low temperature. However, at a 2.5 ratio there is available some 4,000 times as much energy and satisfactory instruments begin to become possible. With a 2 to 1 ratio temperatures slightly below room temperatures can be measured but, of course, only at decreased accuracy.

As set out above the invention is not limited to any one particular kind of detector it being only necessary to use a detector having suitable response at the wavelength used for measuring. In each case the improved accuracy is obtainable but another, though less serious problem arises. When it is necessary to measure detector output, which may be considered electrical current or voltage for a fairly wide range of temperatures the dynamic range of a detector output becomes quite large and soon exceeds the ordinary range of straight forward amplifiers which are, of course, needed. When low energy levels and/or less sensitive detectors are employed this necessitates a more expensive type of electronic circuit, such as logarithmic amplifiers, and as these amplifiers are only approximations of a true logarithmic response there is also some sacrifice in precision and accuracy. When, however, the temperatures to be measured are sufficiently high, for example, from 800° K. up the wavelengths at which measurement takes place occur in the visible or the ultraviolet. This permits the use of a photomultiplier tube which is not only very much more sensitive than thermistor detectors which have to be used at the very low temperatures but it permits a further simplification. Thus in instruments for measuring temperatures from about 800° K. to 3,000° K. or slightly higher a photomultiplier tube constitutes the preferred form of the instrument of the present invention.

With photomultiplier tubes it is possible to eliminate logarithmic amplifiers by using a variable voltage supply and operating the photomultiplier tube at a fixed output current. Temperature measurement is now in terms of applied voltage but since the current increases very rapidly with voltage a high degree of compression is obtained. For example, in ordinary commercial photomultiplier tubes changing volts from 250 to 1,000 results in a current gain of 10,000. This is comparable to the compression obtained with a four-stage logarithmic amplifier. It is thus possible to operate with photomultiplier volts either without an amplifier or with a very simple inexpensive amplifier which does not have to be logarithmic. This second feature which is present in the specific and preferred aspect of the present invention makes for very much cheaper instrumentation. Compared to high sensitivity thermistor bolometers, photomultiplier tubes are extremely cheap and amplifier costs can be cut by a large factor.

The invention will be described in conjunction with an instrument capable of measuring temperatures from slightly below 1,000° K. to around 3,000° K. This instrument uses a photomultiplier tube and, therefore, embodies both of the novel features which are characteristic of the preferred embodiment of the invention.

The invention will also be described in conjunction with the drawings in which:

FIG. 1 is a diagrammatic illustration of an instrument using a photomultiplier tube, and FIG. 2 is a graph of temperature versus voltage for the instrument of FIG. 1.

The instrument in FIG. 1 is in diagrammatic form, as the design of the individual optical elements forms no part of the present invention except insofar as they determine the wavelength band used for measuring. The instrument illustrated is designed to operate on a narrow wavelength band at approximately $0.3\mu$. A doublet lens is shown at 1 of suitable material for the ultraviolet such as quartz. A narrow band transmission filter is shown at 2 with a field stop 3. Radiation in the narrow band passing through the field stop is then distributed over the cathode of a photomultiplier tube 5 by means of a field lens 4 which images the entrance pupil of the system thereon. The photomultiplier tube is operated at a suitable moderate current $10\mu a$ which is read on microammeter 6. The current is maintained constant by adjusting the variable high voltage supply 7 for the photomultiplier tube and the voltage is measured on the voltmeter 8. In operation the instrument is sighted on the material, the temperature of which is to be measured, and the voltage adjusted until the microammeter 6 reads $10\mu a$. Then the voltmeter 8 is read and temperature is read off from the chart shown in FIG. 2 for a constant photomultiplier output current of $10\mu a$. No amplifier is used though, of course, the specific modification of the invention is not limited to a photomultiplier tube used without an amplifier.

If it were desired to effect measurements much below 800° K., for example measurements near 300° K., a thermistor bolometer has to be used. This is much less sensitive than a photomultiplier tube and so a high gain amplifier is needed, preferably a logarithmic amplifier. The output of the amplifier is recorded by conventional recording instruments which can be calibrated to read temperatures. However, as was pointed out above when measuring such low temperatures it is not possible to use so big a ratio of $\lambda_m/\lambda$ and a ratio of 2.5 is about as large as can be used with the energy available.

The relative insensitivity to changes in emissivity which can be achieved by the present invention can be illustrated by a practical example. If it is desired to measure the temperature of molybdenum at 2,000° K. emissivity becomes a real problem because the emissivity of the metal may change from as little as .5 to as much as .9. However, at this temperature and using a measuring wavelength of $0.3\mu$ the rate of change of temperature to compensate for emissivity, $de/dT$ is about 22, that is to say a 22% change in emissivity produces only a 1% change in temperature reading. If then the instrument is calibrated for an emissivity about in the middle of the range the readings at the extremes will introduce an error of approximately 2% or slightly under. Such insensitivity to emissivity is not approached by other radiation thermometers.

The instrument has been illustrated diagrammatically with dioptric collecting optics. As has been pointed out above the exact construction of the optics is of no concern to the present invention and any suitable optics whether dioptric, catoptric or catadioptric can be used. The choice need depend only on the convenience for instrumentation at the particular wavelengths used.

I claim:

1. An instrument for radiation temperature measurement comprising in combination and optical alignment
    (a) a single radiation detector,
    (b) means for collecting radiation and concentrating it on the detector,
    (c) a narrow transmission filtering means passing only a single band centered about a wavelength from one-sixth to one-half the wavelength of maximum radiation for the temperature to be measured, and
    (d) means for indicating radiation detector output.

2. An instrument according to claim 1 in which the radiation detector is a photomultiplier tube and the filter passes a band of radiation to which the photomultiplier tube is sensitive.

3. An instrument according to claim 2 comprising means for reading photomultiplier output current, a variable D.C. voltage supply for the photomultiplier tube and means for indicating the voltage of said supply, whereby when the instrument is operated at constant photomultiplier tube output current variations in voltage correspond to a greatly increased variation in radiation received by the photomultiplier tube by a factor determined by the number of dynodes in the photomultiplier tube.

4. An instrument according to claim 3 in which the temperature range is from about 800° K. to somewhat over 3,000° K. and the filters select a radiation band from $0.3\mu$ to approximately $0.4\mu$.

References Cited by the Examiner
UNITED STATES PATENTS

| | | | |
|---|---|---|---|
| 1,856,969 | 5/32 | Reiter et al. | 250—86 |
| 2,109,235 | 2/38 | Kott | 250—86 |
| 2,161,644 | 6/39 | Van Der Gritten | 250—83.3 |
| 2,496,879 | 2/50 | Lafferty | 250—83.3 |
| 2,812,444 | 11/57 | Hallden | 250—207 |
| 2,844,033 | 7/58 | Tandler | 250—83.3 |
| 2,927,502 | 3/60 | Watrous | 73—355 |
| 3,031,576 | 4/62 | Loy | 250—86 |

RALPH G. NILSON, *Primary Examiner.*

ARCHIE R. BORCHELT, *Examiner.*